(12) United States Patent
Hegel et al.

(10) Patent No.: US 11,602,152 B2
(45) Date of Patent: Mar. 14, 2023

(54) INDUSTRIAL EQUIPMENT FOR THE TREATMENT OF PRODUCE

(71) Applicant: Apeel Technology, Inc., Goleta, CA (US)

(72) Inventors: Cody Hegel, Goleta, CA (US); Stephen William Kaun, Goleta, CA (US); Claire Patterson, Goleta, CA (US); Louis Perez, Goleta, CA (US); Matthew Taylor Aronson, Goleta, CA (US); Matthew Dominick Gaudioso, Goleta, CA (US)

(73) Assignee: Apeel Technology, Inc., Goleta, CA (US)

( * ) Notice: Subject to any disclaimer, the term of this patent is extended or adjusted under 35 U.S.C. 154(b) by 0 days.

(21) Appl. No.: 17/263,690

(22) PCT Filed: Jul. 19, 2019

(86) PCT No.: PCT/US2019/042693
§ 371 (c)(1),
(2) Date: Jan. 27, 2021

(87) PCT Pub. No.: WO2020/023319
PCT Pub. Date: Jan. 30, 2020

(65) Prior Publication Data
US 2021/0289801 A1    Sep. 23, 2021

Related U.S. Application Data

(60) Provisional application No. 62/711,384, filed on Jul. 27, 2018.

(51) Int. Cl.
*A23B 7/16*     (2006.01)
*A23P 20/00*    (2016.01)
(Continued)

(52) U.S. Cl.
CPC ............. *A23B 7/16* (2013.01); *A23B 7/158* (2013.01); *A23L 3/3589* (2013.01); *A23P 20/19* (2016.08); *B05B 13/0235* (2013.01); *B05B 16/95* (2018.02)

(58) Field of Classification Search
CPC ......... A23B 7/16; A23B 7/158; A23L 3/3589; A23P 20/19; B05B 13/0235; B05B 16/95;
(Continued)

(56) References Cited

U.S. PATENT DOCUMENTS 1,957,964 A  *  5/1934  Jones .................... A23N 12/02
                                                        34/336
2,033,044 A     3/1936  McDill et al.
(Continued)

FOREIGN PATENT DOCUMENTS

CN        2555640       6/2003
CN        201595155     10/2010
(Continued)

OTHER PUBLICATIONS

PCT International Preliminary Report on Patentability in International Appln. No. PCT/US2019/042693, dated Feb. 11, 2021, 8 pages.
(Continued)

*Primary Examiner* — Laura Edwards
(74) *Attorney, Agent, or Firm* — Fish & Richardson P.C.

(57) ABSTRACT

An application system for forming protective coatings over perishable items, including: a bed including a plurality of rollers, wherein each of the rollers is configured to rotate at a predetermined rotational rate, thereby causing the perishable items on the bed to rotate; one or more sprayers over a first portion of the bed; one or more blowers over a second portion of the bed; a mixing system configured to prepare a mixture including a coating agent in a solvent; and a liquid
(Continued)

delivery system connected inline between the mixing system and the one or more sprayers.

19 Claims, 7 Drawing Sheets

(51) Int. Cl.
*B05B 16/00* (2018.01)
*A23B 7/158* (2006.01)
*A23L 3/3589* (2006.01)
*B05B 13/02* (2006.01)

(58) Field of Classification Search
CPC .... B05B 13/0221; B65G 17/24; B65G 39/20; A23N 15/06
USPC .................................................. 118/24, 322
See application file for complete search history.

(56) References Cited

U.S. PATENT DOCUMENTS

| | | | |
|---|---|---|---|
| 3,407,678 A | | 10/1968 | Steinke |
| 3,488,200 A | | 1/1970 | Glasgow et al. |
| 3,715,024 A | | 2/1973 | Mumma |
| 4,262,794 A | | 4/1981 | Bourgeois |
| 4,331,691 A | | 5/1982 | Poovaiah et al. |
| 4,331,693 A | | 5/1982 | Wojciechowski et al. |
| 4,726,898 A | | 2/1988 | Mills et al. |
| 5,101,763 A | | 4/1992 | Creason et al. |
| 5,727,711 A | | 3/1998 | Emond et al. |
| 6,004,604 A | | 12/1999 | Thomas, Jr. et al. |
| 6,148,989 A | * | 11/2000 | Ecker ..................... A23N 15/00 209/912 |
| 6,409,041 B1 | | 6/2002 | Overholt et al. |
| 8,445,045 B2 | * | 5/2013 | Goetz ................. B05B 13/0235 118/18 |
| 8,904,952 B2 | * | 12/2014 | Sardo ...................... A23B 7/16 118/16 |
| 9,475,643 B1 | | 10/2016 | Odman et al. |
| 2006/0037892 A1 | | 2/2006 | Blanc |
| 2007/0237893 A1 | | 10/2007 | Moore et al. |
| 2009/0242579 A1 | | 10/2009 | Huang |
| 2011/0259263 A1 | | 10/2011 | Sardo et al. |
| 2012/0269941 A1 | | 10/2012 | Goetz |
| 2015/0321832 A1 | | 11/2015 | Bankowski |
| 2017/0073532 A1 | | 3/2017 | Perez et al. |
| 2020/0253228 A1 | | 8/2020 | Holland et al. |
| 2021/0163217 A1 | | 6/2021 | Perez et al. |

FOREIGN PATENT DOCUMENTS

| | | |
|---|---|---|
| CN | 101897464 | 12/2010 |
| CN | 207040847 | 2/2018 |
| DE | 3622191 | 1/1988 |
| DE | 29912621 | 12/1999 |
| EP | 1854360 | 11/2007 |
| ES | 1041955 | 8/1999 |
| GB | 2339766 | 2/2000 |
| WO | 2010031929 | 3/2010 |
| WO | WO 2014085845 | 6/2014 |
| WO | WO 2017172951 | 10/2017 |
| WO | WO 2019028043 | 2/2019 |

OTHER PUBLICATIONS

PCT International Preliminary Report on Patentability in International Appln. No. PCT/US2019/045784, dated Feb. 25, 2021, 10 pages.

PCT International Preliminary Report on Patentability in International Appln. No. PCT/US2018/044633, dated Feb. 13, 2020, 15 pages.

PCT International Search Report and Written Opinion in International Appln. No. PCT/US2018/044633, dated Nov. 19, 2018, 24 pages.

PCT International Search Report and Written Opinion in International Appln. No. PCT/US2019/042693, dated Oct. 2, 2019, 8 pages.

PCT International Search Report and Written Opinion in International Appln. No. PCT/US2019/045784, dated Oct. 22, 2019, 14 pages.

PCT Invitation to Pay Additional Fees and, Where Applicable, Protest Fee in International Appln. No. PCT/US2018/044633, dated Sep. 11, 2018, 2 pages.

Extended European Search Report in European Appln. No. 19842141. 4, dated Mar. 29, 2022, 8 pages.

* cited by examiner

INDUSTRIAL EQUIPMENT FOR THE TREATMENT OF PRODUCE

CROSS REFERENCE TO RELATED APPLICATIONS

This application is a National Stage Application under 35 U.S.C. § 371 and claims the benefit of International Application No. PCT/US2019/042693, filed Jul. 19, 2019, which claims priority to, and the benefit of, U.S. Provisional Patent Application No. 62/711,384, filed Jul. 27, 2018, the contents of which are hereby incorporated by reference in their entirety.

TECHNICAL FIELD

The present disclosure relates to industrial equipment designed to facilitate treatment of produce, agricultural products, and other items and methods of making and using thereof.

BACKGROUND

Common agricultural products, such as fresh produce, are highly susceptible to degradation and decomposition (i.e., spoilage) when exposed to the environment. The degradation of the agricultural products can occur via abiotic means as a result of evaporative moisture loss from an external surface of the agricultural products to the atmosphere, oxidation by oxygen that diffuses into the agricultural products from the environment, mechanical damage to the surface, and/or light-induced degradation (i.e., photodegradation). Furthermore, biotic stressors, such as bacteria, fungi, viruses, and/or pests, can also infest and decompose the agricultural products.

After being harvested, produce and other agricultural products are commonly moved to packing houses, where they are sorted and packaged. On many commercial packing lines, the agricultural products may be treated, for example, with waxes which preserve the products, with sanitizing agents which reduce or eliminate bacteria or other biotic stressors, and/or with solutions that can form protective coatings over the products. While some of these processes may be performed manually, industrial equipment which either automates the processes or more easily facilitates carrying out the processes can be highly beneficial.

SUMMARY

Described herein are industrial application systems for treating (e.g., forming protective coatings on) produce, agricultural products, or other items. Accordingly, an application system for forming protective coatings over perishable items can include a bed comprising a plurality of rollers, wherein each of the rollers is configured to rotate at a predetermined rotational rate, thereby causing the perishable items on the bed to rotate. The application system can further include one or more sprayers over a first portion of the bed, and one or more blowers over a second portion of the bed. The application system can further include a mixing system configured to prepare a mixture comprising a coating agent in a solvent, and a liquid sprayer delivery system or liquid delivery system connected inline between the mixing system and the one or more sprayers.

Any of the application systems described herein can include one or more of the following features, either alone or in combination with one another. The application system can be configured such that the mixture is applied to the perishable items via the one or more sprayers while the perishable items are rotating and are over the first portion of the bed. The application system can be configured such that after the mixture is applied to the perishable items, the perishable items move to over the second portion of the bed, and while the perishable items are rotating and are over the second portion of the bed the one or more blowers at least partially remove the solvent from the surfaces of the perishable items, thereby causing the protective coatings to be formed over the perishable items. The mixing system can cause at least 95% of coating agent particles in the mixture to have a size in a range of 50 nm to 2000 nm or 75 nm to 1000 nm after the mixture has been mixed in the mixing system for between 5 and 30 minutes. The rollers can comprise brushbed rollers. One or more rollers in the first portion of the bed can comprise a first type of brushbed roller and one or more rollers in the second portion of the bed can comprise a second type of brushbed roller different from the first type of brushbed roller. The blowers can be configured to heat the air or gas dispensed therefrom. The second portion of the bed can be less than 12 feet long. The entire length of the bed can be less than 20 feet. The one or more blowers can be configured to substantially dry each of the perishable items in a time of 300 seconds or less.

A method of forming a protective coating over a plurality of perishable items can include the steps of:
  (i) placing the perishable items on a bed of an application system, wherein the application system comprises:
    the bed, wherein the bed comprises a plurality of rollers, wherein each of the rollers is configured to rotate at a predetermined rotational rate, thereby causing the perishable items on the bed to rotate;
    one or more sprayers over a first portion of the bed;
    one or more blowers over a second portion of the bed;
    a mixing system configured to prepare a mixture comprising a coating agent in a solvent; and
    a liquid delivery system connected inline between the mixing system and the one or more sprayers;
  (ii) while the perishable items are rotating and are over the first portion of the bed, causing the mixture to be applied to the perishable items via the one or more sprayers; and
  (iii) while the perishable items are rotating and are over the second portion of the bed, allowing the one or more blowers to at least partially remove the solvent from the surfaces of the perishable items, thereby causing the protective coating to be formed over the perishable items.

Any of the methods described herein can include one or more of the following features, either alone or in combination with one another. The mixing system can cause at least 95% of coating agent particles in the mixture to have a size in a range of 50 nm to 2000 nm or 75 nm to 1000 nm after the mixture has been mixed in the mixing system for between 5 and 30 minutes. The rollers can comprise brushbed rollers. One or more rollers in the first portion of the bed can comprise a first type of brushbed roller and one or more rollers in the second portion of the bed can comprise a second type of brushbed roller different from the first type of brushbed roller. The blowers can heat the air or gas dispensed therefrom while the perishable items are over the second portion of the bed. The second portion of the bed can be less than 12 feet long. The entire length of the bed can be less than 20 feet. The one or more blowers can substantially dry each of the perishable items in a time of 300 seconds or less while the perishable items are over the second portion of the bed.

BRIEF DESCRIPTION OF THE DRAWINGS

Like numerals in the figures represent like elements.

DETAILED DESCRIPTION

Conveyor systems can be used in produce packing houses to transport harvested produce, agricultural products, or other perishable items from one section of the packing house to another. For example, produce can be received at a receiving dock, where it is then sorted, for example by size, color, and/or stage of ripening. The sorted produce can then be transported via conveyor systems to other sections of the packing house, where it can, for example, be treated (e.g., sanitized, coated with protective waxes or other coatings, and/or dried) and then packaged for storage or delivery.

Figure 1:
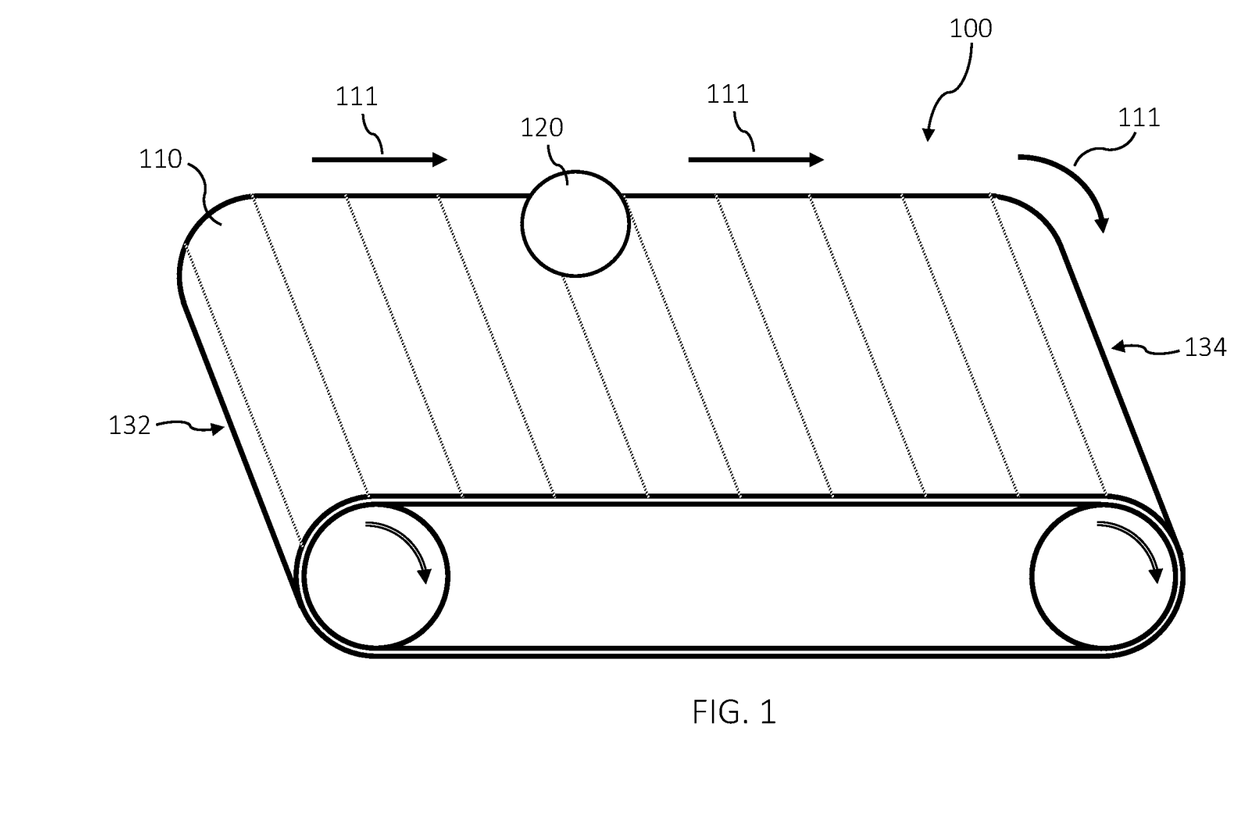
FIG. 1 is a schematic illustration of an exemplary conveyor system.

An exemplary conveyor system 100 that can, for example, be used for transport of produce within packing houses is illustrated in FIG. 1. The conveyor system 100 includes a bed 110 that moves in the direction indicated by arrows 111. Produce or other perishable items 120 are placed on the upper surface of the bed 110 and then transported from the first side 132 to the second side 134 of the conveyor system 100. The bed 110 can be formed of a sanitary material, or of a material that can be readily sanitized or disinfected, in order to prevent the produce from being exposed to or infected by bacteria, fungi, viruses, or other biotic stressors. The bed 110 can also be designed to be easily detachable from the rest of the system in order to simplify sanitization procedures. In the conveyor system of FIG. 1, the produce 120 remains stationary with respect to the bed 110 during transport. That is, relative to (or in the reference frame of) the bed 110, the produce 120 does not roll, slide, or otherwise move.

Industrial equipment for treating produce or other agricultural products with solvents, solutions, waxes, or other coatings can utilize a conveyor system for moving the products while the solutions or coatings are applied and optionally while the products are subsequently dried. For such equipment, it can be preferable to implement a conveyor system that causes the products to simultaneously rotate as they move from one side of the bed to the other in order to better facilitate complete surface coverage and/or drying. Additionally, the industrial equipment can also include other components such as sprayers and/or blowers that directly treat and/or facilitate drying of the products while they are on the bed. For example, one or more sprayers can be mounted over the bed and used to spray liquid droplets of solvent or solution on the produce as it passes the sprayers. The liquid droplets can, for example, include a sanitizing agent such as ethanol. The liquid droplets can alternatively include water, combinations of ethanol and water, or other solvents suitable for treatment of the products. As further described below, the liquid droplets can, for example, include a coating agent which forms a protective coating over the produce or agricultural product on which it is sprayed. Alternatively, the sprayers can indirectly treat or coat the produce by saturating rollers over which the produce moves. The rollers can move independently from the belt or chain drive system that moves the conveyor, rotating the produce, such that the rollers act to coat the produce with the solution thereon.

Other types of components for treating produce on the conveyor system bed can also be integrated into the industrial equipment. For example, fans, blowers, or air knives can be mounted with their exhaust over the bed of the conveyor system and used to blow air or other gasses (e.g., nitrogen gas or air/nitrogen mixtures) onto the produce in order to facilitate drying of the produce. The industrial equipment can also optionally include a mixing system for preparing solutions or suspensions that are sprayed onto the products, as well as a liquid delivery system that transports the solution/suspension from the mixing system to the sprayers at a suitable pressure and flow rate.

Figure 2:
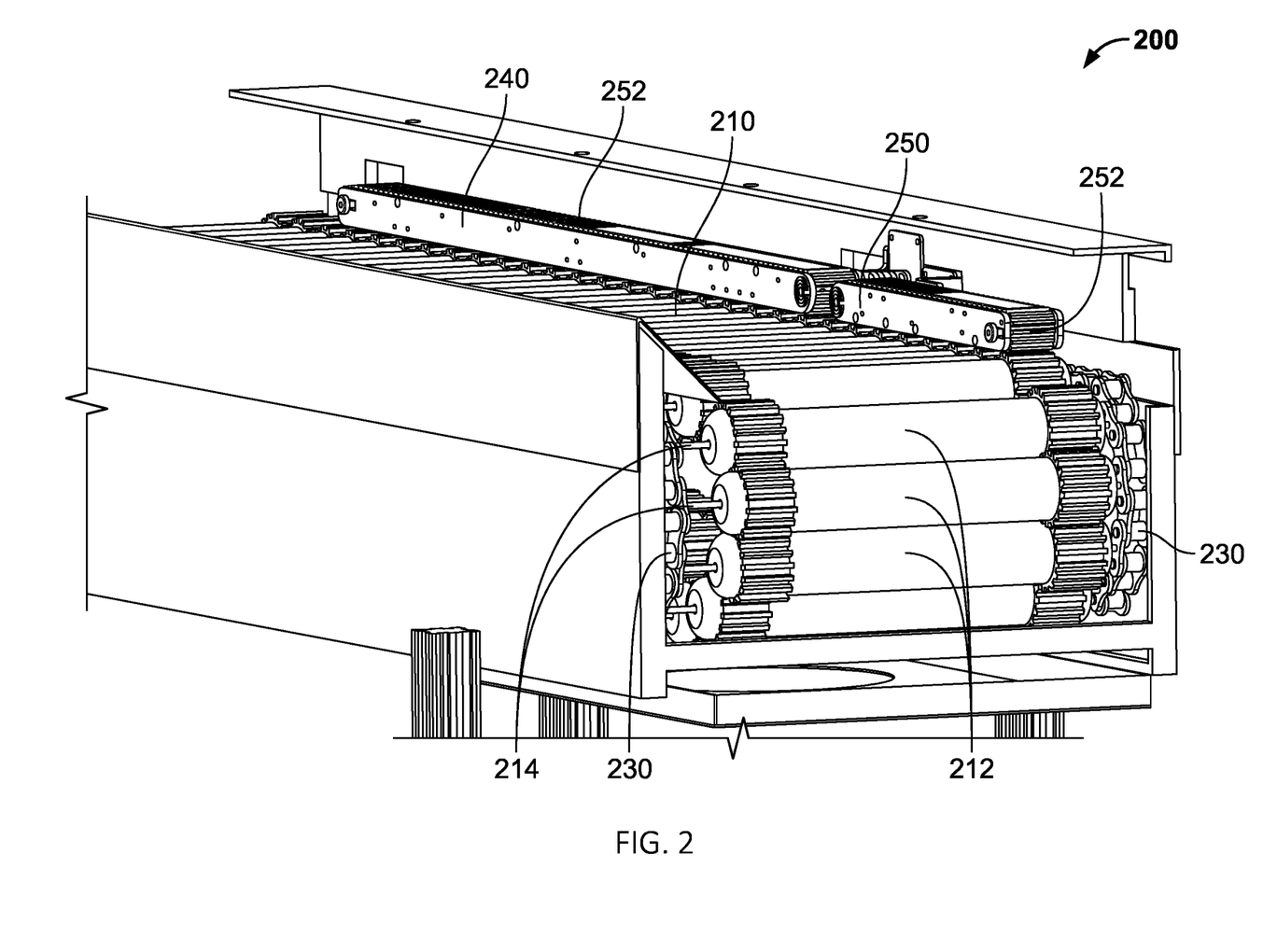
FIG. 2 is a schematic illustration of an exemplary conveyor system.

FIG. 2 is a schematic illustration of an exemplary conveyor system 200 that is capable of rotating produce, perishable items, or other objects as they move from one side of the bed to the other, and is thus suitable for use in industrial equipment in which items are coated with liquid and/or dried. Conveyor system 200 includes a bed 210 formed from a plurality of cylindrical rollers 212, each roller having an axis 214 parallel to that of each of the other rollers 212. The rollers 212 are pulled in a direction perpendicular to their axes 214 at a translational speed v by a chain 230 connected to the axis 214 of each of the rollers. A motor (not shown) drives the chain 230, thereby controlling the translational speed of the bed 210. The rollers 212 are each configured to be able to rotate about their axes 214 by allowing the axes 214 to rotate (i.e., with minimal rotational friction) relative to the chain 230.

Conveyor system 200 further includes multiple rotation inducing devices 240 and 250, each contacting a different set of rollers 212 of bed 210. Rotation inducing device 240 and 250 each induce rotation in the rollers to which they are instantaneously in contact with. Rotation inducing devices 240 and 250 each include a ribbed belt 252 wrapped around a pair of pulleys. As shown, the ribs of the ribbed belts 252 are configured to slot between teeth in the edge regions of each of the rollers 212. For each rotation inducing device, the ribbed belt can be driven around the pulleys at a user determined speed. In this way, the specific rate of rotation of the rollers contacting the rotation inducing devices 240 and 250 can be precisely controlled, thereby controlling the rate of rotation of any objects that are on the rollers. As such, sprayers placed above the bed (not shown) are able to cover the entire surface of the treated objects with liquid spray, and blowers having their exhaust placed above the bed (not shown) are able to more effectively dry the objects. Alternatively, as discussed above, the sprayers can saturate the rollers with a coating solution and the saturated rollers coat the produce as it rotates over the rollers.

Figure 3:
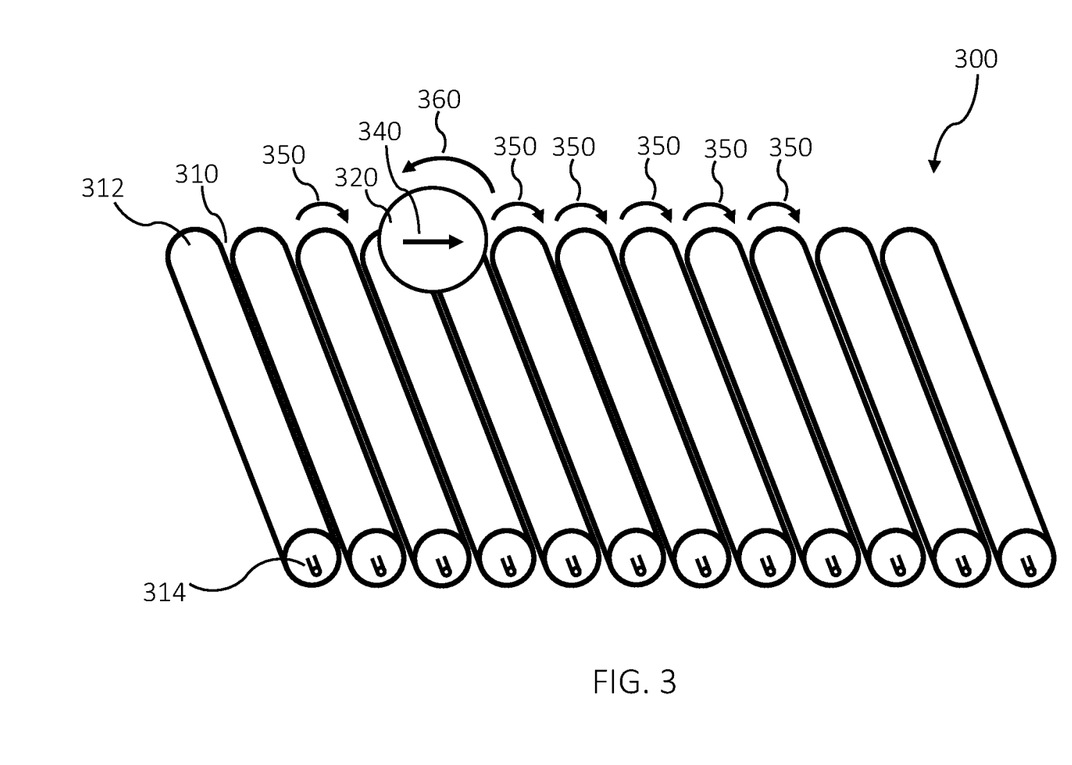
FIG. 3 is a schematic illustration of an exemplary conveyor system.

FIG. 3 illustrates another exemplary conveyor system 300 that is capable of rotating produce, perishable items, or other objects as they move from one side of the bed to the other. The bed 310 of conveyor system 300 is made up of a plurality of rotational devices 312. During operation of conveyor system 300, each rotational device 312 is rotated about its axis 314 in the direction indicated by arrows 350 but does not otherwise have any translational motion. Objects 320 that are placed on the bed translate horizontally in the direction indicated by arrow 340 while also rotating in the direction indicated by arrow 360. Rotational devices 312 can be cylindrical rollers, similar to those shown in conveyor system 200. Alternatively, rotational devices 312 can each be brushbed rollers, each formed of brushes extending out from the axis 314. Alternatively, the bed can use a combination of cylindrical and brushbed rollers, and/or can include different types of brushbed rollers at different locations.

The rotational motion 360 of the object 320 on the bed 310 results from the rotational motion 350 of the rotational devices 312. However, depending on the specific design of the rotational devices 312 and the shape and size of the object 320, the translational motion 340 of the object 320 may or may not be caused by the rotational motion 350 of the rotational devices 312. For example, in the case where the rotational devices 350 are solid rollers and the object 320 is large and irregularly shaped, the rotational motion 350 of the rotational devices 312 can also cause the object 320 to translate horizontally. However, if the rotational devices 350 are brushbed rollers and the object 320 is relatively small and/or fairly regularly shaped, the rotational motion 350 of the rotational devices 312 may not independently cause the object 320 to translate in the direction indicated by arrow 340. Instead, if a single object 320 were placed on the bed 310, it would simply rotate without translating horizontally. In the latter case, horizontal translation of objects 320 across the bed 310 can be achieved by constantly loading more objects onto the bed 310, such that the newly added objects push the objects ahead of them in the direction indicated by arrow 240. For example, in some implementations, during operation of conveyor system 300, objects 320 are continuously loaded onto the bed 310 via a second conveyor system (e.g., the conveyor system 100 shown in FIG. 1) placed inline with the conveyor system 300. In this case, the average speed at which objects translate laterally is determined by the mass flow rate of objects delivered onto the bed 310.

Figure 4:
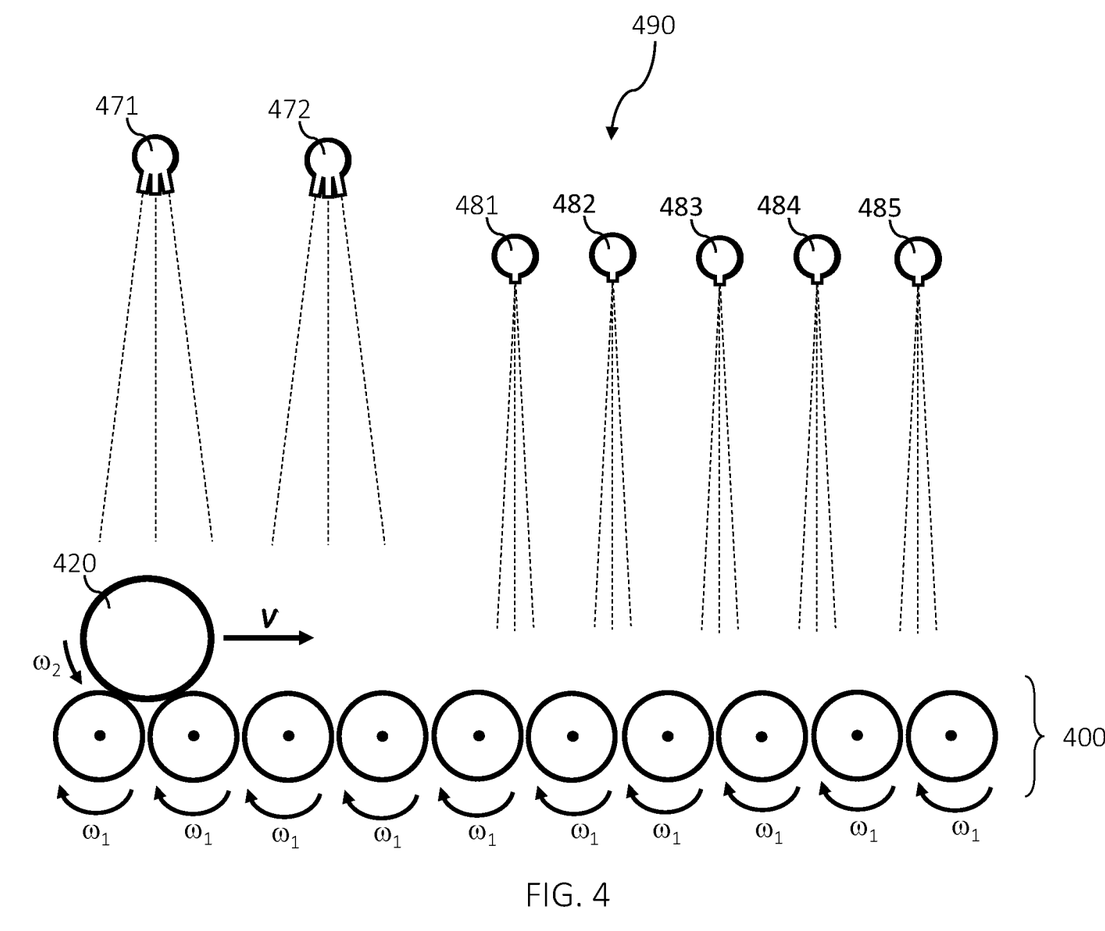
FIG. 4 is a schematic illustration of an exemplary piece of industrial equipment that can be used to treat produce or other items.

FIG. 4 is a schematic illustration of an exemplary industrial system 490 that can be used to treat produce, agricultural products, or other perishable items. The industrial system 490 includes a conveyor system 400, which is shown to be the same as conveyor system 300 of FIG. 3 but could alternatively be designed similarly to conveyor system 200 of FIG. 2. The industrial system 490 also includes sprayers 471-472 over a first portion of the bed and blowers 481-485 over a second portion of the bed. Produce or other items 420 that are placed on the bed first are first coated with liquid from the sprayers 471-472, and then pass under the blower exhausts 481-485 which expedite the drying of the items 420. Note that sprayers 471 and 472 can each include multiple spray heads, and blower exhausts 481, 482, 483, 484, and 485 can each be connected to an individual blower or can all be connected to a single blower. Alternatively, as discussed above, the sprayers can saturate the rollers with a coating solution and the saturated rollers coat the produce as it rotates over the rollers.

As previously described, industrial system 490 can be used to form protective coatings (e.g., edible coatings) over items 420 such as produce, agricultural products, or other edible products. For example, while the object 420 moves laterally down the bed and is simultaneously rotated by the rollers, sprayers 471-472 can spray droplets of a solution, suspension, or emulsion including a coating agent (e.g., a solute) in a solvent over the surface of the object 420. Once the object is covered with solution, suspension, or emulsion, it then passes beneath the blower exhausts 481-485, which expedite removal (e.g., evaporation) of the solvent while the object 420 is on the conveyor system 400, thereby allowing the solute composition (e.g., the coating agent) remaining on the surface of the object 420 to form the protective coating over the surface.

The protective coating formed from the solute composition can be used to prevent food spoilage due to, for instance, moisture loss, oxidation, or infection by a foreign pathogen. The solvent in which the coating agent is dissolved or suspended can, for example, be water, an alcohol (e.g., ethanol, methanol, isopropanol, or combinations thereof), acetone, ethyl acetate, tetrahydrofuran, or combinations thereof. The coating agent can, for example, include monoacylglycerides, fatty acids, esters (e.g., fatty acid esters), amides, amines, thiols, carboxylic acids, ethers, aliphatic waxes, alcohols, fatty acid salts, organic salts, inorganic salts, or combinations thereof. In some implementations, the coating agent includes monomers, oligomers, or combinations thereof, including esters or salts formed thereof. Examples of coating agents and solvents used in the formation of protective coatings can be found in U.S. patent application Ser. No. 15/330,403, titled "Precursor Compounds for Molecular Coatings", now U.S. Pat. No. 10,266, 708, which is hereby incorporated by reference in its entirety.

Sprayers 471-472, as well as the rollers that are underneath the sprayers, can be optimized to minimize the residence time required for items 420 to be underneath the sprayers 471-472 and be fully coated with the sprayed liquid. For example, the rollers under sprayers 472 can each be a first type of brushbed roller optimized to absorb liquid that is sprayed thereon by sprayer 472 and to subsequently "brush" it onto items that pass thereover. The rollers under sprayers 471 can be the same as those under 472, or can alternatively be a second type of brushbed roller that is different from the first type of brushbed roller and which can, for example, be optimized to better facilitate rotation of the items 420 as they pass underneath sprayers 471. In some methods of operation of the industrial system 490, sprayers 472 spray liquid continuously while there are no objects beneath sprayers 472 in order to keep the rollers thereunder saturated, and optionally do not spray liquid while there are objects on the bed beneath. In other methods of operation, sprayers 472 spray liquid continuously both while there are objects on the bed beneath and when there are no objects on the bed beneath. In some methods of operation, sprayers 471 spray liquid while there are objects on the bed beneath but not while there are no objects beneath. In some methods of operation, sprayers 471 spray liquid continuously both while there are objects on the bed beneath and when there are no objects on the bed beneath.

The rollers in the systems described herein can be of any design and manufactured of any material which facilitates/ improves movement of the produce and/or application of a material to the produce. In some embodiments, the portion of the application section of the system (e.g., the portion of the bed beneath the sprayers) closest to where items are loaded onto the bed contains straight polyether sulfone (PSE) and/or PSE/horsehair brushes, and the portion of the application system closest to where items are removed from the bed contains scalloped PSE and/or PSE/horsehair brushes. The straight brushes line up produce or other items to assist in the translation and uniformity of items entering the system, while the scalloped brushes cause increased contact of product (e.g., coating solution/suspension/emulsion) onto the lined up produce, allowing for the highest efficiency in application in that section.

Figure 5A:
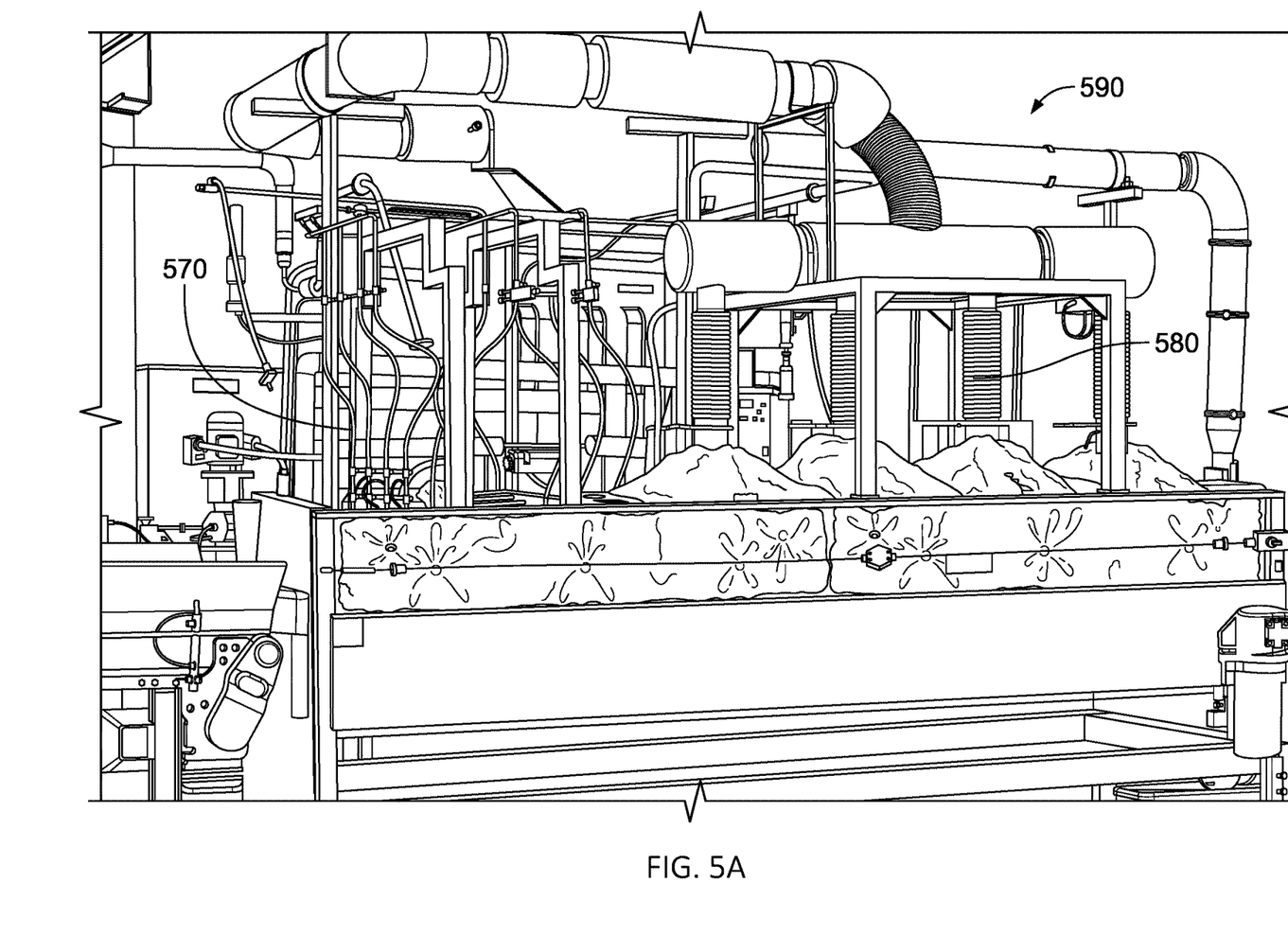
FIGS. 5A, 5B, and 5C are photographs from various angles of an industrial system for treating items such as produce.
Figure 5B:
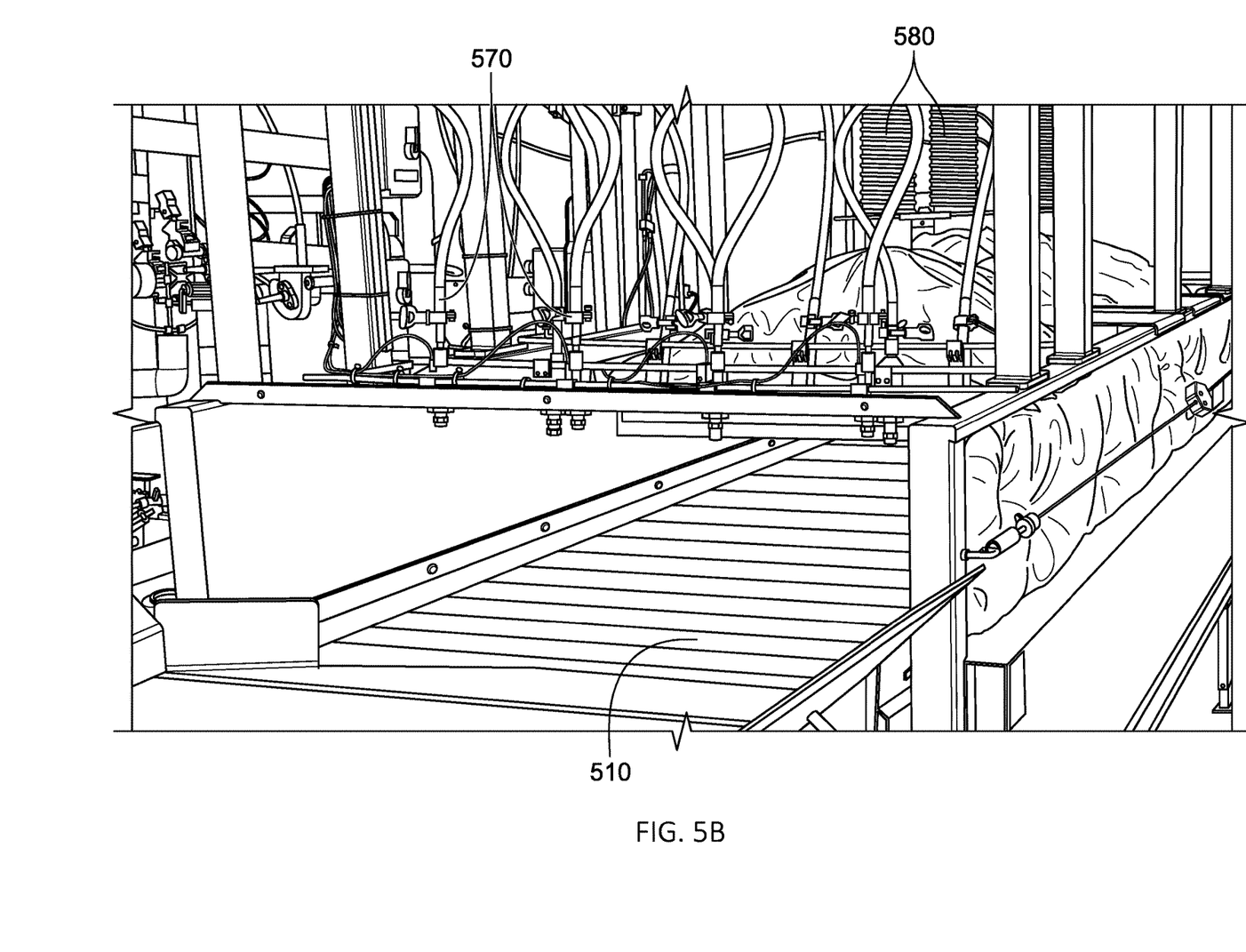
Figure 5C:
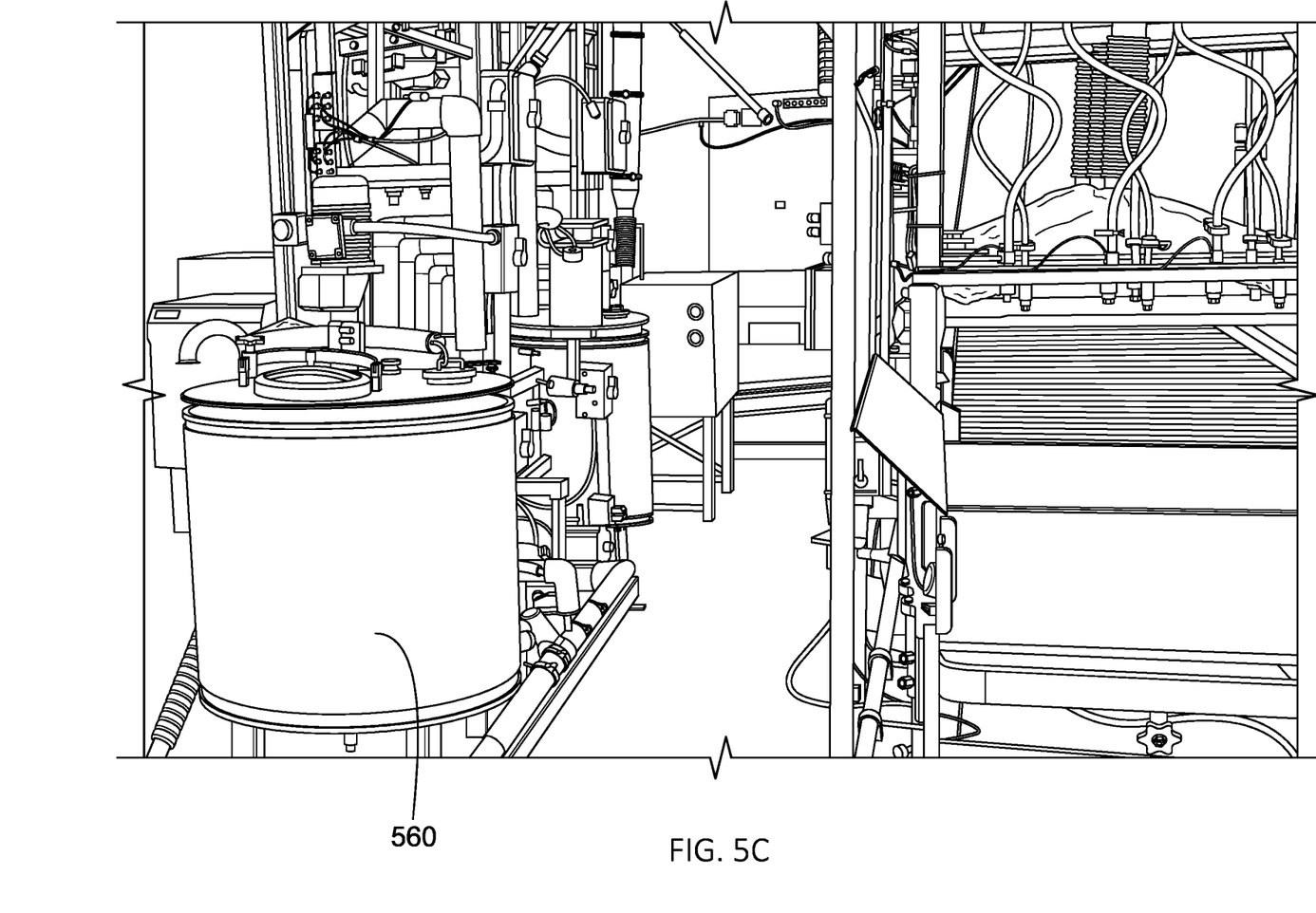

The liquid that is sprayed by the sprayers 471-472 can be prepared in one or more mixing tanks (560 in FIG. 5C). Water and/or any other solvents can be supplied to the mixing tanks from outside the battery limits of the industrial equipment 490. When water is supplied, depending on the quality of the water, water pre-treatment equipment may be included as well. In some embodiments, the conductivity of the water is less than about <0.1 micro S/cm. The liquid in the tanks can be prepared by heating to a target temperature, adding a coating agent or other additive or solute, and pumping the undispersed mix through a controlled high shear device in a recirculation loop until the additive is well dispersed. In some embodiments, the temperature is from about 60° C. to about 80° C., from about 60° C. to about 75° C., from about 60° C. to about 70° C., from about 65° C. to about 70° C., or about 65° C. In some embodiments, the system achieves a shear rate above 10,000 $S^{-1}$ (e.g., above 20,000 $S^{-1}$, 30,000 $S^{-1}$, 40,000 $S^{-1}$, or 50,000 $S^{-1}$). In some embodiments, the system achieves a homogeneous mix in less than about 30 minutes (e.g., less than 25 minutes, 20 minutes, or 15 minutes). In some embodiments, the particle size of at least 95% (e.g., at least 96%, at least 97%, at least 98%, at least 99%, or substantially all) of the coating agent particles within the mix (e.g., the solution or suspension) along the longest dimension of each particle is smaller than about 2500 nm (e.g., in a range of about 50-2000 nm, 60-2000 nm, 75-2000 nm, 100-2000 nm, 50-1500 nm, 60-1500 nm, 75-1500 nm, 100-1500 nm, 50-1000 nm, 60-1000 nm, 75-1000 nm, 100-1000 nm, 50-800 nm, 60-800 nm, 75-800 nm, 100-800 nm, 50-600 nm, 60-600 nm, 75-600 nm, or 100-600 nm).

Once the solution/suspension in the tanks is prepared, it is delivered to the sprayers and sprayed onto underlying rollers and/or any items on the bed beneath the sprayers. The liquid delivery system, which is connected inline between the tanks and the sprayers, can provide a controlled pressure and flowrate of liquid to the sprayers so that the amount and distribution of liquid sprayed over the equipment and items to be treated can be precisely controlled. The flowrate of liquid that is emitted from the sprayers can be controlled by an actuating valve in the spray nozzle or by the pump in the liquid delivery system. The value which the flowrate is set to can depend at least partially on the rotation rate of the rollers and/or on the translational rate of objects on the bed. In particular, use of brushbed rollers in one or more of the configurations previously described can allow for high material use efficiency and correspondingly low sprayer flowrates.

The length of the section of the bed over which sprayers are mounted is preferably kept as short as possible while still allowing for sufficient coverage of the items by the sprayed liquid as well as minimum residence time of the items beneath the sprayers. In some embodiments, the length of the section of the bed over which sprayers are mounted is less than about 10 feet, for example less than about 9 feet, less than about 8 feet, less than about 7 feet, less than about 6 feet, or less than about 5 feet. In some embodiments, the total residence time of items underneath the sprayers is below about 2 minutes, (e.g., below about 100 seconds, below about 90 seconds, below about 80 seconds, below about 70 seconds, below about 60 seconds, below about 50 seconds, below about 40 seconds, below about 30 seconds, below about 20 seconds, or below about 10 seconds).

After the liquid from sprayers 471 and 472 is applied to the items 420, the items then pass under the drying system, which include blower exhausts 481-485 connected to their respective blower (remainder of blower not shown). Although 5 sets of blower exhausts are shown in FIG. 4, the actual number of exhausts can be greater than or less than 5. For example, the drying system can include 1 blower exhaust, 2 blower exhausts, 3 blower exhausts, 4 blower exhausts, 5 blower exhausts, or 6 or more blower exhausts. The blower(s) connected to the exhausts can dispense air and/or other gasses (e.g., nitrogen, hydrogen, air, or combinations thereof) onto the items 420. In some embodiments, the blowers are equipped with heaters that heat the air and/or other gasses as they are dispensed from the blowers. Heated air/gas can cause the solvent to evaporate more quickly and in some cases may result in more uniform protective coatings being formed over the items from coating agents in the liquid. In some embodiments, the air/gas is dispensed from the blowers at a temperature of at least 30° C., at least 40° C., at least 50° C., at least 60° C., at least 70° C., at least 80° C., at least 90° C., at least 100° C., between 30° C. and 110° C., between 40° C. and 110° C., between 50° C. and 110° C., between 60° C. and 110° C., between 70° C. and 110° C., between 80° C. and 110° C., between 90° C. and 110° C., between 30° C. and 100° C., between 40° C. and 100° C., between 50° C. and 100° C., between 60° C. and 100° C., between 70° C. and 100° C., between 80° C. and 100° C., or between 90° C. and 100° C.

In some embodiments, the blowers are centrifugal blowers capable of providing high velocity (and optionally heated) air/gas to dry the items through convection. For example, the velocity of air/gas dispensed from the blowers can be at least 50 ft/min, at least 60 ft/min, at least 70 ft/min, at least 80 ft/min, at least 90 ft/min, at least 100 ft/min, 50-110 ft/min, 60-110 ft/min, 70-110 ft/min, 80-110 ft/min, 90-110 ft/min, 50-100 ft/min, 60-100 ft/min, 70-100 ft/min, 80-100 ft/min, or 90-100 ft/min. Custom air plenums can be used to force a pressure drop across the width of the bed in order to ensure a balanced airflow to all items passing beneath the drying system and to cause the maximum amount of fluid to evaporate from the items before the items reach the end of the bed. The relative humidity between the blowers and the underlying bed while air/gas is dispensed from the blowers can be below 50%, below 40%, below 30%, or below 20%. Substantially complete drying of the items by the drying system can be achieved in times of about 300 seconds or less, 270 seconds or less, 240 seconds or less, 210 seconds or less, 180 seconds or less, 150 seconds or less, or 120 seconds or less.

In the drying section of the bed (e.g., the section beneath the blowers), a mixture of quick dry and nylon, or full nylon, rollers can be utilized to minimize the loss of product (e.g., coating agent) from the surface of the items being coated while drying/depositing the most product onto the surface as possible. This allows for the drying of water to occur simultaneously with the formation of the film without removal of the product. Other methods of drying can decrease the performance of the resulting protective coatings, while this method generates a significant improvement to the performance of the coatings. Finally, the combination of the nylon and quick dry rollers can allow for the mass flow of produce or other items through the drying section without any issues of piling up of the items/produce. In other words, through different combinations of nylon and rubber rollers, it is possible to avoid any issues associated with degradation of the applied coatings that may result from translation of items in a mass flow system and the friction associated with the combinations of solvent and coating agent that is applied to the items.

The length of the section of the bed over which the blower exhausts are mounted can be less than about 12 feet, for example less than about 11 feet, less than about 10 feet, less than about 9 feet, less than about 8 feet, or less than about 7 feet. Accordingly, the entire length of the bed can be less than about 20 feet, for example less than about 19 feet, less than about 18 feet, less than about 17 feet, less than about 16 feet, less than about 15 feet, less than about 14 feet, less than about 13 feet, less than about 12 feet, or less than about 11 feet, thereby resulting for a very compact design while still allowing for complete coating and drying of the items placed on the bed.

The industrial system 490 can be configured or adapted to treat/coat produce such as avocados, lemons, oranges, apples, plums, grapefruits, peaches, or the like. Accordingly, the roller diameter can be in a range of about 3 to 30 cm, for example 5 to 30 cm, 7 to 30 cm, 10 to 30 cm, 3 to 20 cm, 5 to 20 cm, 7 to 20 cm, or 10 to 20 cm.

The industrial system 490 can be at least partially controlled and/or automated via a computer and associated software. The automated control can allow the system 490 to generate continuous flow of product (e.g., solutions, suspensions, or emulsions used to treat items) through automatic switches to the sprayers, and can control/switch operation cycles of the mixing system between formulating (e.g., preparing the product) and delivery of the product to the sprayers for application to items so that there is no lull in treatment of items.

FIGS. 5A-5C are photographs of an industrial system 590 constructed in accordance with the description of industrial system 490 of FIG. 4. The industrial system 590 includes a bed 510 containing multiple brushbed rollers, mixing tanks 560 which form part of a mixing system, sprayers 570, and blowers 580. The system 590 has been found to been found to apply solutions to and dry produce at much a much faster rate than conventional spray systems. Furthermore, the mass loss rates of a variety of produce have unexpectedly been much lower when coated with the system 590 as compared to when coated with conventional spray systems, even when the solution or suspension used to form the coating was identical in both systems.

Various implementations of conveyor and industrial coating systems and associated methods of use have been described. However, it should be understood that they have been presented by way of example only, and that various changes in form and details may be made. For example, industrial systems described herein can also be used to treat (e.g., sanitize, coat, and/or dry) other types of substrates, such as meat, poultry, plants, textiles/clothing material, pharmaceuticals, medical equipment, or other substrates, including edible and non-edible substrates. Where methods and steps described above indicate certain events occurring in certain order, those of ordinary skill in the art having the benefit of this disclosure would recognize that the ordering of certain steps may be modified and such modification are in accordance with the variations of the disclosure. Accordingly, other implementations are within the scope of the following claims.

The invention claimed is:

1. An application system for forming protective coatings over perishable items, comprising:
 a bed comprising:
  a plurality of rollers, wherein each of the rollers is configured to rotate at a predetermined rotational rate, thereby causing the perishable items on the bed to rotate;
 one or more sprayers over a first portion of the bed; one or more sets of blowers over a second portion of the bed, wherein the bed comprises:
  a rotation inducing device in contact with the first portion of the bed, and the contact between the rotation inducing device and the rollers of the first portion of the bed causes rotation at the predetermined rotational rate, and
  a second rotation inducing device in contact with the second portion of the bed, and the contact between the second rotation inducing device and the rollers of the second portion of the bed causes rotation at a second predetermined rotational rate;
 a mixer system configured to prepare a mixture comprising coating agent particles in a solvent; and
 a liquid sprayer delivery system connected inline between the mixer system and the one or more sprayers, wherein the liquid sprayer delivery system is configured such that a flowrate of the mixture is controlled by a pump in the liquid sprayer delivery system based on a rotation rate of the rollers and/or on a translational rate of perishable items on the first portion of the bed and the mixture is applied to the perishable items via the one or more sprayers while the perishable items are rotating and are over the first portion of the bed.

2. The application system of claim 1, wherein the application system is further configured such that after the mixture is applied to the perishable items, the perishable items move to over the second portion of the bed, and while the perishable items are rotating and are over the second portion of the bed the one or more sets of blowers at least partially remove the solvent from surfaces of the perishable items, thereby causing the protective coatings to be formed over the perishable items.

3. The application system of claim 1, wherein the mixer system comprises the mixture and the mixer system causes at least 95% of the coating agent particles in the mixture to have a size in a range of 50 nm to 2000 nm after the mixture has been mixed in the mixing system for between 5 and 30 minutes.

4. The application system of claim 3, wherein the size is in a range of 75 nm to 1000 nm.

5. The application system of claim 1, wherein the rollers comprise brushbed rollers.

6. The application system of claim 1, wherein one or more rollers in the first portion of the bed comprise a first brushbed roller and one or more rollers in the second portion of the bed comprise a second brushbed roller different from the first brushbed roller.

7. The application system of claim 1, wherein the sets of blowers are configured to heat air or gas dispensed therefrom.

8. The application system of claim 1, wherein the second portion of the bed is less than 12 feet long.

9. The application system of claim 8, wherein an entire length of the bed is less than 20 feet.

10. The application system of claim 8, wherein the one or more sets of blowers are configured to substantially dry each of the perishable items in a time of 300 seconds or less.

11. The application system of claim 1, wherein the one or more sets of blowers are configured to substantially dry each of the perishable items in a time of 300 seconds or less.

12. The application system of claim 1, wherein the application system is configured to cause perishable items on the system to move at a translational velocity, the translational velocity determined by a mass flow rate of the perishable items.

13. A method of forming a protective coating over a plurality of perishable items, comprising:
(i) placing the perishable items on a bed of an application system, wherein the application system comprises:
the bed, wherein the bed comprises a plurality of rollers, wherein each of the rollers is configured to rotate at a predetermined rotational rate, thereby causing the perishable items on the bed to rotate;
one or more sprayers over a first portion of the bed;
one or more sets of blowers over a second portion of the bed, wherein the bed comprises:
  a rotation inducing device in contact with the first portion of the bed, and the contact between the rotation inducing device and the rollers of the first portion of the bed causes rotation at the predetermined rotational rate, and
  a second rotation inducing device in contact with the second portion of the bed, and the contact between the second rotation inducing device and the rollers of the second portion of the bed causes rotation at a second predetermined rotational rate;
a mixer system configured to prepare a homogenous mixture comprising a coating agent in a solvent; and
a liquid sprayer delivery system connected inline between the mixing system and the one or more sprayers, wherein the liquid sprayer delivery system is configured such that a flowrate of the homogenous mixture is controlled by a pump in the liquid sprayer delivery system based on a translational rate of the bed;
(ii) while the perishable items are rotating and are over the first portion of the bed, causing the homogenous mixture to be applied to the perishable items via the one or more sprayers; and
(iii) while the perishable items are rotating and are over the second portion of the bed, allowing the one or more sets of blowers to at least partially remove the solvent from surfaces of the perishable items, thereby causing the protective coating to be formed over the perishable items.

14. The method of claim 13, comprising preparing the mixture by the mixer system, wherein preparing the mixture causes at least 95% of coating agent particles in the mixture to have a size in a range of 50 nm to 2000 nm after the mixture has been mixed in the mixing system for between 5 and 30 minutes.

15. The method of claim 14, wherein the size is in a range of 75 nm to 1000 nm.

16. The method of claim 13, wherein the rollers comprise brushbed rollers.

17. The method of claim 13, wherein one or more rollers in the first portion of the bed comprise a first brushbed roller and one or more rollers in the second portion of the bed comprise a second brushbed roller different from the first brushbed roller.

18. The method of claim 13, wherein the sets of blowers heat air or gas dispensed therefrom while the perishable items are over the second portion of the bed.

19. The method of claim 13, wherein the second portion of the bed is less than 12 feet long, and an entire length of the bed is less than 20 feet long.

* * * * *